Feb. 12, 1924.
O. A. OWEN
MOTION PICTURE FILM
Filed Feb. 20, 1923
1,483,109
2 Sheets-Sheet 1
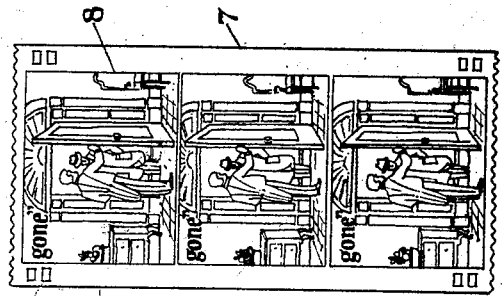
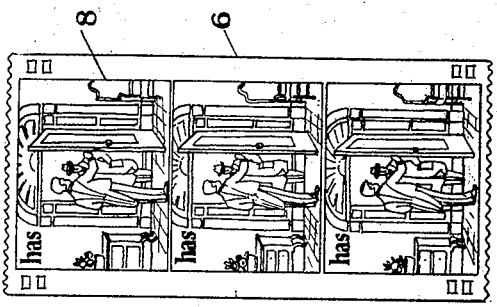
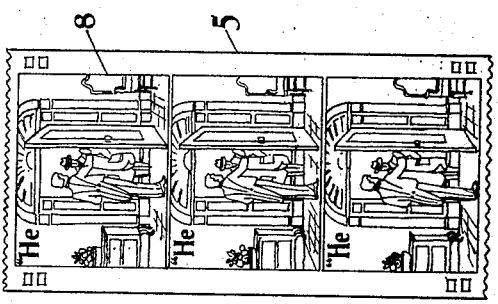
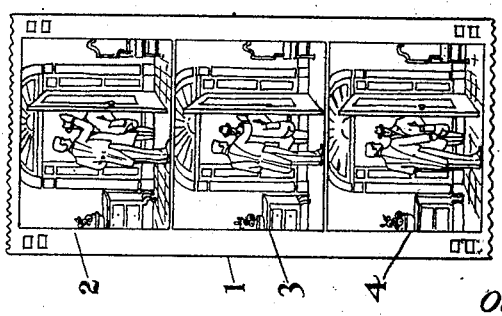
Inventor
Ole Andrew Owen
By Whittemore Hulbert Whittemore
 Belknap
Attorney

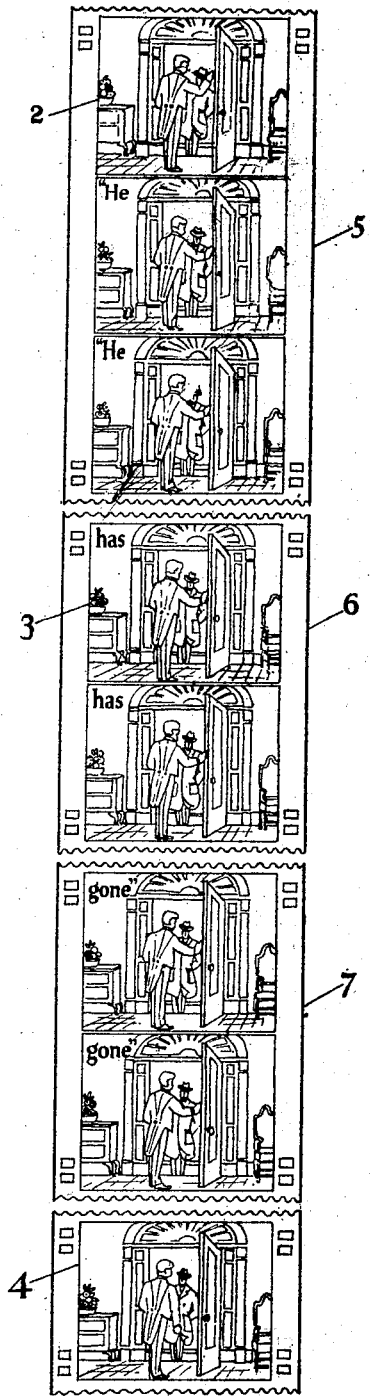

Patented Feb. 12, 1924.

1,483,109

UNITED STATES PATENT OFFICE.

OLE ANDREW OWEN, OF DETROIT, MICHIGAN.

MOTION-PICTURE FILM.

Application filed February 20, 1923. Serial No. 620,201.

*To all whom it may concern:*

Be it known that I, OLE ANDREW OWEN, a citizen of the United States of America, residing at Detroit, in the county of Wayne and State of Michigan, have invented certain new and useful Improvements in Motion-Picture Films, of which the following is a specification, reference being had therein to the accompanying drawings.

This invention relates to motion picture films.

An object of the invention is to provide a film having characters or subtitles which are superposed directly upon the scenes so that the scenes and subtitles will be presented simultaneously.

Another object is to provide a film in which the scenes are immobilized while the subtitles are presented so that the spectators may be able to read the subtitles without losing sight of or interest in the picture.

Another object is to provide a film having subtitles composed of words which are preferably arranged in series upon the scenes so that they may be presented one by one or in series corresponding to the manner of human speech and will produce a dramatic effect which is similar to that obtained by actors upon the stage.

With the above and other objects in view, the invention consists in certain novel features of construction as will be more fully described and particularly pointed out in the appended claims.

In the accompanying drawings:

Figure 1 shows a portion of a film of the usual type having different scenes arranged in succession;

Figures 2 to 4 inclusive show portions of a film having wording thereon according to my invention;

Figure 5 shows portions of a film embodying my invention.

Usually the subtitles employed to explain the action in certain parts of a picture are in the nature of paragraph inserts which are displayed between scenes of the picture. However, this is very objectionable because it interrupts the action of the picture. In order to overcome the use of such inserts one inventor introduced a film having successive spaced portions provided with successive scenes and corresponding spaced portions between the scenes and occupied by single words or sentences to cause the words or sentences, when the film is projected upon a screen, to have an apparent effect of being superposed upon the scenes. However, it has been found that considerable time and labor is required to manufacture such a film, consequently the cost of manufacturing the same is quite high. Moreover, it has been found that such a construction is apt to produce a flicker which is objectionable. It has also been found that the white back ground for the words causes the scenes, when projected upon the screen, to appear slightly gray which is objectionable.

Some manufacturers have produced films having the words arranged in series and superposed upon the scenes of the film, but the scenes having the words thereon change, consequently, the spectator is very apt to lose sight of either a part of the action of the picture or else some of the words explaining the same for the reason that one detracts from the other.

Other manufacturers, and particularly those producing "animated cartoons" have introduced films having sections provided with different scenes arranged in succession and sections provided with immobilized scenes arranged in succession, but the subtitles are superposed in paragraph form upon the immobilized scenes, consequently the words of the subtitles are not delivered one by one corresponding to the manner of human speech, and the desired dramatic effect is lost.

With the present invention, all of the objectionable features just referred to are entirely overcome and the words are arranged in series upon scenes which are immobilized. That is, the scenes having the subtitles thereon remain the same while the subtitles are presented. Thus the spectator may read the words of an entire paragraph and will not miss any of the action in the picture.

Referring now to the drawings in which like characters of reference designate corresponding parts throughout the several views, the numeral 1 designates a section of a film which may be produced in the usual way and which has different scenes 2, 3 and 4 respectively.

Assuming that "He has gone" is to be the subtitle, to explain the words spoken by one of the men in scene 3, then three relatively short sections of film 5, 6 and 7 having successive scenes 8 thereon corresponding to the scene 3, are produced and are inserted between scenes 2 and 4 in lieu of scene 3. The word "He" is superposed upon each of the scenes of the section 5; the word "has" is superposed upon each of the scenes of the section 6, while the word "gone" is superposed upon each of the scenes of the section 7.

The words are preferably located in one corner of the scene and if relatively short words such as "I do" or "I am", etc., are used, in the subtitles, then two such words may be superposed together.

When a film embodying my invention is projected upon a screen, the successive scenes change in the usual way until the first series of scenes having a subtitle superposed thereon is reached, whereupon one scene will appear continuously while the different words of the subtitle will appear one or two at a time. After the subtitle has been shown in this manner, the scenes that follow will change again as usual.

While it is believed that from the foregoing description, the nature and advantages of the invention will be readily apparent, I desire to have it understood that I do not limit myself to what is herein shown and described and that such changes may be resorted to when desired as fall within the scope of what is claimed.

What I claim as my invention is:

1. A motion picture film having a section provided with a series of different scenes, a second section provided with immobilized scenes, and characters superposed upon said immobilized scenes.

2. A motion picture film having a section provided with a series of different scenes, a second section provided with immobilized scenes, and different characters superposed upon said immobilized scenes.

3. A motion picture film having a series of different scenes, a second series of scenes, each scene of the second series being the same, and wording upon each scene of the second series.

4. A motion picture film having a series of different scenes, a second series of scenes, each scene of the second series being the same, and different wording upon each scene of the second series.

5. A motion picture film having a section provided with different scenes arranged in succession, a section provided with series of scenes corresponding to one of the scenes of the first section, and wording superposed upon the scenes of the second section.

6. A motion picture film having a series of scenes, each scene being the same, and words superposed upon the scenes of the series, certain of said words being upon each scene of the series.

7. A motion picture film having different scenes, a series of scenes between the scenes aforesaid, each scene of the series being the same, and a subtitle superposed upon the scenes of the series, a portion of the subtitle being upon each scene of the series.

8. A motion picture film having a plurality of sections provided with different scenes arranged in succession, a section between the sections aforesaid provided with immobilized scenes, and a subtitle superposed upon the immobilized scenes in such a manner that the words of the subtitle will appear one by one when the film is projected upon a screen.

In testimony whereof I affix my signature.

OLE ANDREW OWEN.